Sept. 27, 1949.   A. J. NARCOVICH   2,483,224
PEDAL MECHANISM

Filed Oct. 21, 1947   2 Sheets-Sheet 1

Inventor

Adolph J. Narcovich

By *Clarence A. O'Brien and Harvey B. Jacobson*
Attorneys

Sept. 27, 1949.  A. J. NARCOVICH  2,483,224
PEDAL MECHANISM
Filed Oct. 21, 1947  2 Sheets-Sheet 2
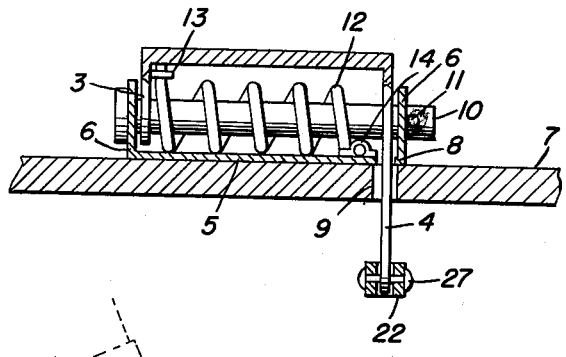
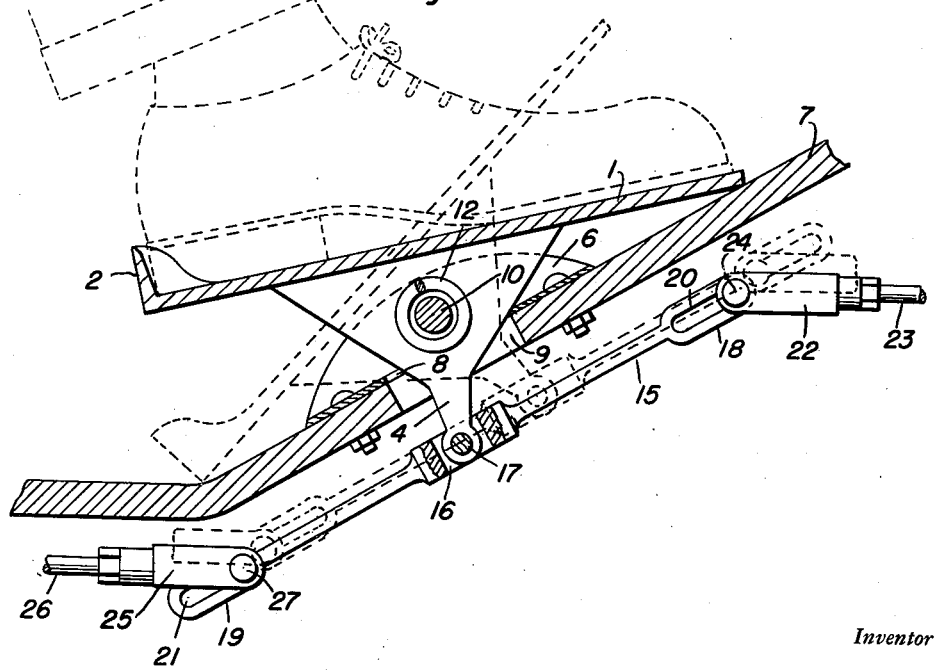
Inventor
Adolph J. Narcovich
By Clarence A. O'Brien
and Harvey B. Jacobson
Attorneys Patented Sept. 27, 1949

2,483,224

UNITED STATES PATENT OFFICE 2,483,224

PEDAL MECHANISM

Adolph J. Narcovich, Ashland, Pa.

Application October 21, 1947, Serial No. 781,219

1 Claim. (Cl. 74—478)

My invention relates to improvements in pedal mechanisms for automobiles, the principal object in view being to provide means of simple form and inexpensive construction for easy application to an automobile to operate the brakes and carburetor throttle through a single pedal, thereby obviating fatigue on the part of the driver of an automobile resulting from shifting the foot from one pedal to another.

Another object is to provide means of the character and for the purpose above set forth which is safe, will not get out of order nor tire the foot and leg of the operator.

Other and subordinate objects, also within the purview of my invention, together with the precise nature of my improvements will be readily understood when the succeeding description and claims are read with reference to the drawings accompanying and forming part of the specification.

In said drawings:

Figure 3 is a view in transverse section taken on the line 3—3 of Figure 1;

Figure 4 is a view in longitudinal section taken on the line 4—4 of Figure 2 and illustrating the manner in which the pedal is designed to be operated.

Figure 1:
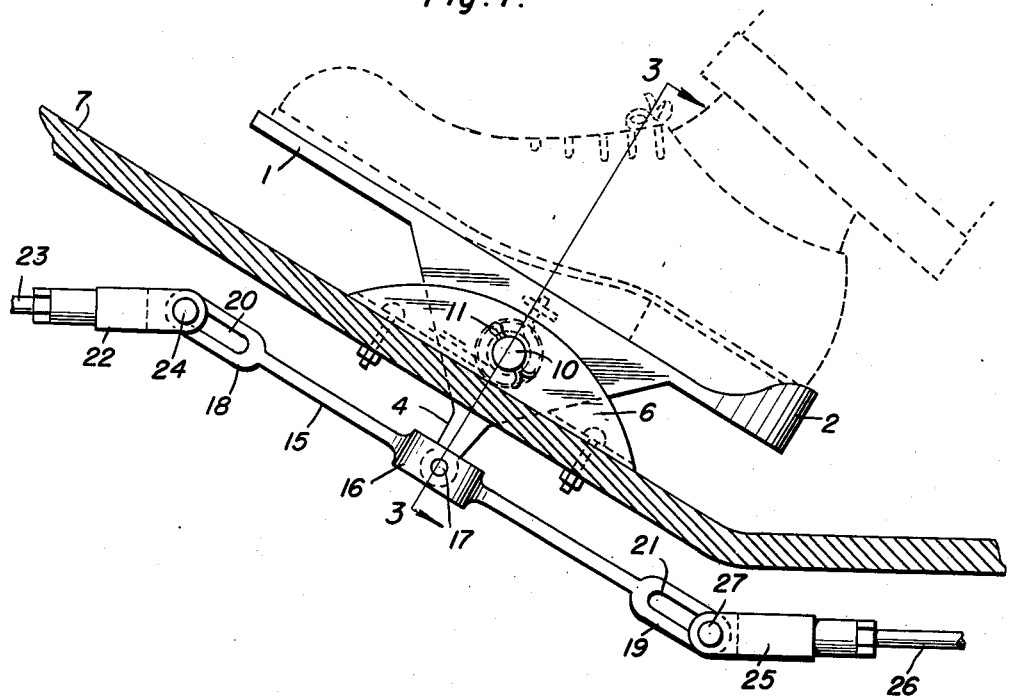
Figure 1 is a view partly in longitudinal section and partly in side elevation of my improved pedal mechanism in a preferred embodiment thereof.
Figure 2:
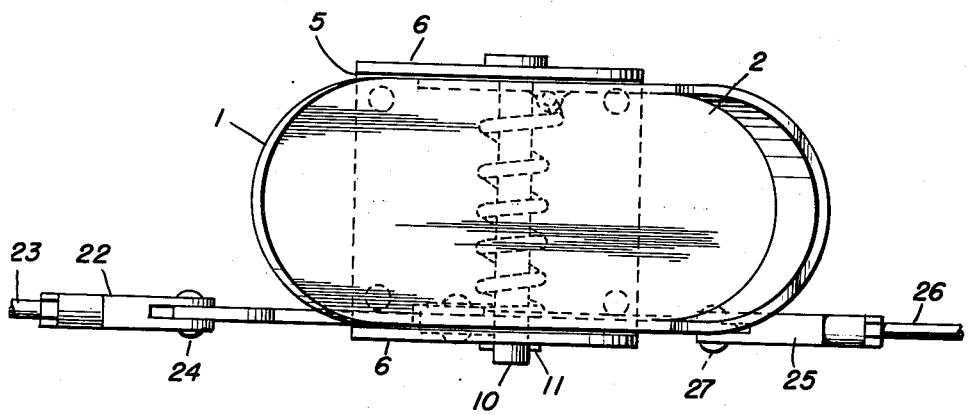
Figure 2 is a view in plan.

Referring now to the drawings by numerals, according to my invention, as illustrated, a foot pedal 1 is provided of generally elongated oval form with an upstanding rear end heel guard 2 for preventing the foot from slipping rearwardly off the pedal 1, said pedal also embodying in the transverse center thereof a depending edge ear 3 on one side and a depending lever arm 4 on the other side thereof.

A channel type bearing bracket 5 with upstanding side flanges 6 is provided for supporting the pedal 1 and is suitably secured to the floor board 7 of an automobile, not shown, with its side flanges 6 extending forwardly and rearwardly, said bracket having a longitudinal side slot 8 therein registering with a similar slot 9 in the floor board 7.

The ear 3 and lever arm 4 fit between the side flanges 6 of said bracket 5 and a cross bolt 10 extends through said flanges and the ear 3 and lever arm 4 with a cotter pin 11 on one end thereof, and whereby said pedal 1 is swingably mounted on said bracket 5 for rocking movement about a transverse axis forwardly and rearwardly respectively, the arrangement being such that the lever arm 4 extends through the slots 8, 9 a distance below the floor board 7 suitable for a purpose presently seen.

A coil spring 12 surrounds the bolt 10 between the ear 3 and the lever arm 4 with one end fixed in a lug 13 on said ear 3 and its other end fixed in a lug 14 on the bottom of the bracket 5, and whereby the pedal 1 is balanced to assume a normal intermediate position parallel to the floor board 7.

A link bar 15 extends beneath the floor board 7 forwardly and rearwardly of the automobile and parallel with said pedal 1, normally. The link bar 15 is provided with a central slot portion 16 into which the lower end of the lever arm 4 extends and is pivoted in said portion by a transverse pin 17. The link bar 15 is provided with enlarged front and rear ends 18, 19 longitudinally slotted, as at 20, 21.

The front end 18 of the link rod 15 is operatively connected to a forked head 22 on a throttle control rod 23 by a cross pin 24 in said head slidable in the slot 20 of said end 19.

The rear end 19 of said link rod 15 is operatively connected to a forked head 25 on the front end of a brake control rod 26 of the automobile and by a cross pin 27 in said head 25 slidable in the slot 21 of said end 19.

In the normal position of the pedal, as shown in Figure 1, the cross pin 24 is positioned in the front end of the slot 20 of the front end 18 of the link rod 15, whereas, the pin 27 is positioned in the rear end of the slot 21 of the rear end 19 of said rod. Consequently, when the pedal 1 is rocked forwardly, as shown in full lines in Figure 4, a pull is exerted on the throttle control rod 23 for operating the usual throttle valve, not shown, of a carburetor for accelerating the speed of the automobile, whereas, the rear end 19 of the link rod 15 slides idly on the cross pin 27 with no effect on the brake control rod 26. When the pedal 1 is rocked rearwardly, as shown by dotted lines in Figure 4, a pull is exerted on the brake control rod 26 to set the brakes, not shown, and the front end 18 of the link rod 15 slides idly on the cross pin 24 and relative to the throttle control rod 23. It will of course be understood, that in the normal position of the pedal 1 and the link rod 15, the throttle and brake control rods 23, 26 are also in normal ineffective position. When the pedal 1 is relieved of pressure of the foot, in either its forwardly or rearwardly rocked position, the coil spring 12 will return the same and the link bar 15 to normal position described, the throttle and brake control rods 23, 26 being returned to normal in effective position by the usual well known means.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

Having described the invention, what is claimed as new is:

Mechanism for operating a throttle control pull rod and a brake control pull rod of an automobile comprising a foot pedal, means for pivotally mounting said pedal for vertical rocking movement forwardly and rearwardly, respectively, from a normal intermediate position, a single lever arm depending from said pedal for swinging in opposite directions by rocking of said pedal forwardly and rearwardly, respectively, means for yieldingly maintaining said pedal in intermediate position, a link pivoted intermediate its ends on said lever arm for vertical rocking and endwise movement thereon and having slot and pin connections with said pull rods whereby swinging of said lever arm in opposite directions exerts a pull on said pull rods alternately, said pin and slot connections providing for lost motion between said link and either pull rod when pull is exerted on the other pull rod.

ADOLPH J. NARCOVICH.

REFERENCES CITED

The following references are of record in the file of this patent:

UNITED STATES PATENTS

| Number | Name | Date |
|---|---|---|
| 1,632,940 | Wright | June 21, 1927 |
| 1,680,549 | Kennington | Aug. 14, 1928 |